Patented Mar. 8, 1949

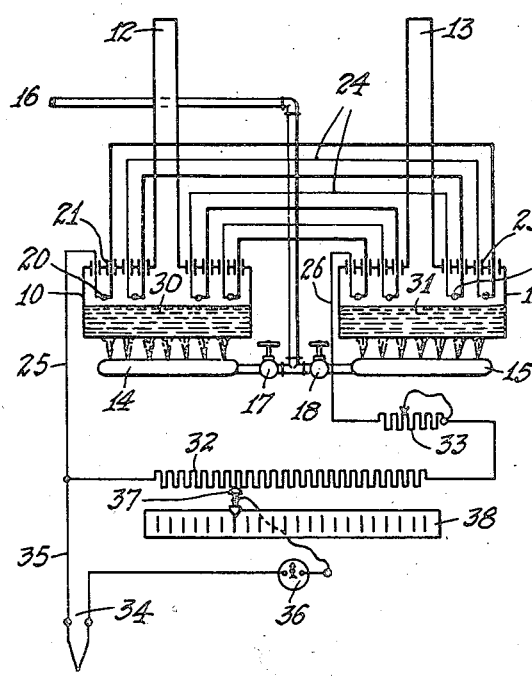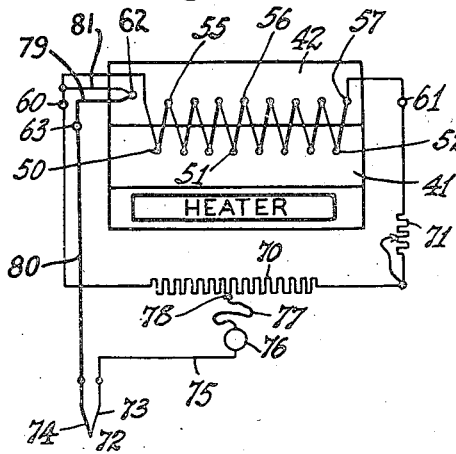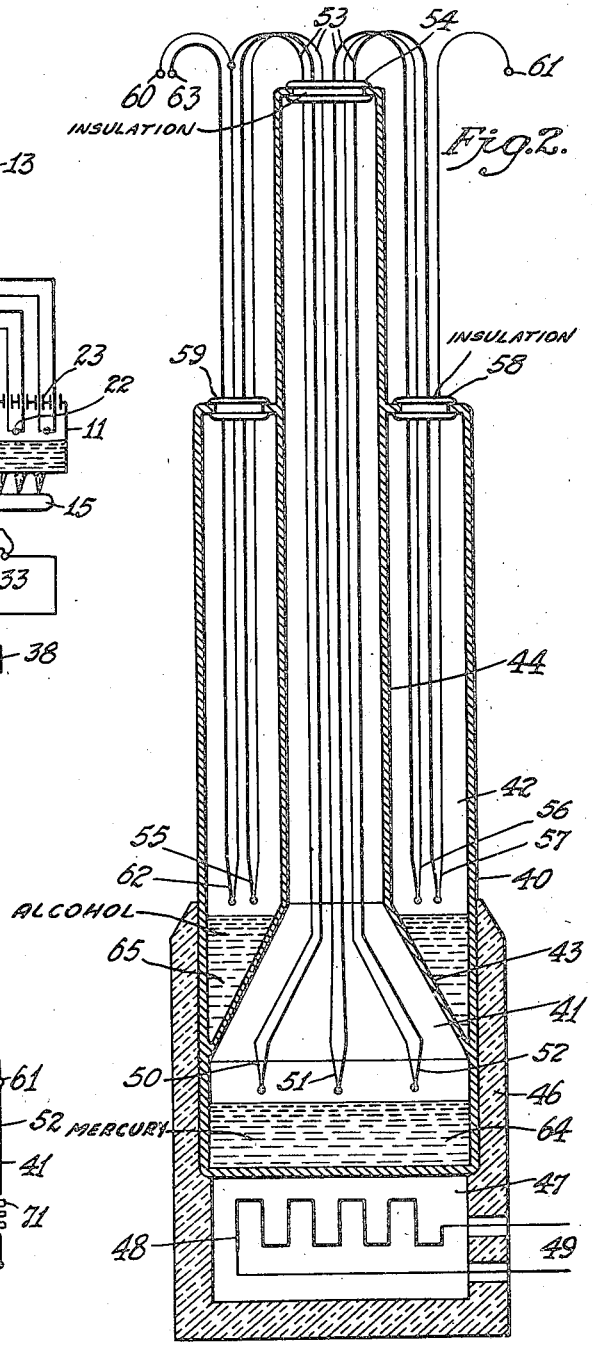

2,463,944

UNITED STATES PATENT OFFICE 2,463,944

CONSTANT POTENTIAL SOURCE OF THE THERMOCOUPLE TYPE

Perry A. Borden, Waterbury, Conn., assignor to The Bristol Company, Waterbury, Conn., a corporation of Connecticut Application October 25, 1943, Serial No. 507,657

7 Claims. (Cl. 136—4)

This invention relates to a source of constant potential electrical energy, and more especially to a thermoelectric generating apparatus from which may be derived a constant unidirectional current adapted to the energization of a potentiometer slide-wire, and to other purposes where a direct current of relatively small value and unvarying constancy is required.

In the precise measurement of unidirectional electric potentials, wide use is made of null methods, in which a potential whose magnitude is to be determined is caused to be opposed by the fall of potential across a portion of a resistance, commonly in the form of a slide-wire, through which is flowing a steady current of predetermined value. When, by means of adjustment, the difference between the measured potential and the utilized portion of the adjustable potential has been reduced to zero, as indicated by a suitable detector in the interconnecting system, a measurement made upon the length or resistance of the portion of the circuit across which the opposing potential exists provides a precise means of determining the value of the potential under measurement. Instruments embodying this principle are generally classified under the name of "potentiometers," and are well known in the art of electrical measurement and may be obtained in a wide variety of types and forms. In order that a potentiometer perform its function of providing a measurement of an electrical potential, it is essential that the current flowing in its resistance element bear a predetermined relation to the resistance value of that element, and also that its intensity be unvarying over extended periods of time and under a wide variety of conditions.

It is an object of the present invention to provide means from which may be derived an electric current of magnitude and constancy adapted to its use in the measuring circuit of a potentiometer.

It is a further object to provide a device of the above nature, which, as an incident to its operation, may be utilized as a means of maintaining constant the temperature of a reference junction in a thermoelectric circuit.

In carrying out the purposes of the invention it is proposed to provide a generator in the form of a thermoelectric system in which opposed junctions of said system will be maintained at temperatures, which, while different, will inherently hold to constant values by utilization of the principle by which a liquid boiling in an enclosed space including provision for condensation of the vapor of said liquid as fast as it is boiled, will inherently tend to maintain within said space a constant temperature as well as a constant pressure. This principle is well known to students of the properties of fluids subjected to various temperature and pressure conditions, and has been effectively utilized by Regnault in his development of a standard method of determining the vapor pressure of liquids. A discussion of the use of this principle in providing constant temperature and pressures will be found by reference to the following publications: (1) A Textbook of Physics: W. Watson, (Longmans, 1907) article 218, pages 248-250: (2) Heat for Advanced Students: E. Edser (MacMillan, 1910), page 225. By suitably selecting liquids and operating pressures, there is made available a wide choice of temperature values; and by combining two such temperature sources in a single thermoelectric system, in accordance with my invention, there may be had a thermoelectric generator adapted to develop an electromotive force of inherently constant value through a considerable variation of ambient conditions.

It is further proposed to apply the above-mentioned principle alternatively in two forms, in one of which two liquids are independently evaporated and their respective vapors independently condensed, and in the other of which that liquid having the higher boiling point receives its heat of ebullition from an outside source and has its vapor condensed by a body of liquid of the lower boiling point, the heat imparted to the latter liquid in condensing the vapor of the former serving to vaporize the latter liquid, whose vapor in turn is condensed by exposure to an externally cooled surface.

In the drawings:

Fig. 1 is a diagrammatic representation of a form of apparatus embodying the principles of the invention.

Fig. 2 is a sectional view of an alternative form of the invention.

Fig. 3 is a diagram showing how the principle of the invention may be adapted to a dual purpose.

Referring now to the drawings:

In Fig. 1 there are shown two vessels 10 and 11, each adapted to contain a liquid and its vapor, and to be sealed from communication with the atmosphere. The vessels are provided with upwardly extended columns 12 and 13 respectively into which the vapors of contained liquids may pass and be condensed by the cooling effect of the surrounding atmosphere. Beneath the vessels 10 and 11 are located heat sources which may be gas burners 14 and 15 adapted to receive a supply of combustible gas from a source 16 through valves 17 and 18 respectively, whereby the flows of gas to the individual burners may be independently adjusted.

Within the vessel 10, and projecting downwardly therein is a group of thermocouples 20 having their separate leads brought to the exterior of said chamber through vapor-tight insulating seals 21. Within the vessel 11 is a similar group of thermocouples 22, projecting downwardly into said vessel and having their connections brought to the exterior through vapor-tight insulating seals 23. The elements of the two groups of thermocouples are interconnected by means of conductors 24, preferably formed of the same materials as the elements of said couples, to form a thermoelectric battery with a free conductor 25 emerging from the vessel 10 and a free conductor 26 emerging from the vessell 11, between which conductors may be developed an electromotive force representative in value of the temperature difference existing between the group of couples 20 and the group of couples 22.

The vessel 10 is partially filled with a liquid 30 having definite boiling point and vapor tension characteristics, and is sealed so as to contain nothing but said liquid in its lower portion and the vapor of the same in its upper portion. The vessel 11 is partially filled with a liquid 31 having definite boiling point and vapor tension characteristics differing from those of the liquid 30, and is likewise sealed to contain nothing but said liquid and its vapor. Xylene and sulphur dioxide respectively may be named as examples of such liquids. Upon application of heat from the burner 14 to the chamber 10 the body of liquid in said chamber will attain a boiling point corresponding to the pressure therein existing; and, so long as the supply of heat is kept such that the liquid evaporated will all be condensed in the column 12, a condition of equilibrium will be attained, and the pressure within said vessel and the temperature of said liquid will remain at constant values. Similarly, the liquid 31 in the vessel 11, being caused to boil by heat from the burner 15, will be maintained at a constant pressure and temperature so long as condensation of vapor in the column 13 takes place as fast as evaporation from the surface of said liquid 31. The groups of thermocouples 20 and 22 being suitably positioned in close proximity to the surfaces of the respective liquids, each group will be maintained at a constant temperature, with the result that the E. M. F. developed between the conductors 25 and 26 will have a constant value.

The conductors 25 and 26 are connected to the respective extremities of an extended slide-wire 32 forming a part of a conventional potentiometer circuit, and having in series therewith an adjustable resistor 33, whereby the current derived from the thermoelectric system and flowing in the slide-wire 32 may be adjusted to a predetermined value. For purposes of measment of an E. M. F., derived from an external source 34, one side of said source is connected to one end of the slide-wire 32, as by a conductor 35, and the other side of said source is connected in series with a galvanometer or other convenient detector 36 to a sliding contact 37 adapted to traverse the slide-wire 32 and to have its excursion therealong indicated by reference to a graduated scale 38.

The operation of the device is as follows: With the burners 14 and 15 adjusted to supply sufficient heat to the chambers 10 and 11 to maintain the respective contained liquids 30 and 31 in a condition of ebullition, but at a rate such that the vapors will be completely condensed in the columns 12 and 13, each of said liquids will be maintained at a constant temperature as hereinbefore set forth, with the result that the thermoelectromotive force developed in the thermocouple system, and representing in magnitude the difference between the temperatures in the respective chambers, will be constant, and will cause a current of constant value, as determined by the setting of the rheostat 33, to pass through the slide-wire 32, thereby developing a fixed E. M. F. between its terminals. Thus according to the well-known principle of the potentiometric method of measurement, the position to which the slider 37 must be adjusted along the slide-wire 32 in order to establish a condition of balance as indicated by the detector 36, will be a measure of the E. M. F. developed at the source 34, and will be quantitatively determined by the position of the slider 37 with respect to the graduated scale 38.

In Fig. 2 is shown a sectional view of a thermoelectric generator embodying the principles of the invention, and having in adjacent but mutually isolated enclosed compartments fluids of different vapor tension characteristics, the liquid phase of one of said fluids being adapted to receive a supply of heat for its vaporization directly from a heating element, and the vapor thereof to be condensed by a body of the liquid phase of the other of said fluids, which latter is at the same time vaporized by heat received from the first-named fluid. This makes possible the vaporization of the two operating liquids from a common source of heat.

A closed vessel 40 is divided into two mutually isolated compartments 41 and 42 by means of a partition 43, each of said compartments being adapted to contain in its lower portion a body of vaporizable liquid, and in its upper portion a quantity of the vapor of said liquid. The partition 43 is so disposed that the chamber 42 lies substantially above the chamber 41, and said partition is adapted to permit a flow of heat from one to the other of said chambers. The partion 43 is extended in a column 44 lying within the chamber 42 and providing an increased surface exposure between said chambers in order to augment interchange of heat between the same. The column 44 may be extended through the top of the chamber 42 into the atmosphere, to provide, if necessary, additional cooling surface for the contents of the chamber 41. The lower portion of the vessel 40 is preferably encased in a covering of thermally insulating material 46 including a heating space 47 in which is positioned an electric heating element 48 adapted to receive a current from a supply 49 and thereby to generate heat in proximity to the bottom of the chamber 41. A group of thermocouples represented in the drawing by three units 50, 51 and 52 project through the column 44 downwardly into the chamber 41, whereby said couples may be juxtaposed to the surface of a liquid contained in said chamber. The thermocouples 50, 51 and 52 are connected to, and supported by, appropriate electrical conductors 53 entering the top of the column 44 through a vapor-tight insulating seal 54, whereby electromotive forces developed in said couples due to the temperature to which they are exposed may be determined exteriorly to the chamber 41. A similar group of three thermocouples 55, 56 and 57 is positioned within the chamber 42 in a manner to measure the temperature of the surface of a liquid therein, the conductors to said couples being brought out through suitable vapor-tight insulating seals 58 and 59. The conductors associated with the two groups of thermocouples are interconnected and brought to terminals 60 and 61 in such a manner that their electromotive forces will combine to produce between said terminals a potential difference representative of the difference in temperature in said chambers. A further thermocouple 62, having one element connected to the terminal 60 and the other to a terminal 63, is provided; and the nature and purpose of this further thermocouple will hereinafter be set forth.

For purposes of operation, the lower chamber 41 has placed therein a quantity of liquid 64 of a relatively high boiling point, such, for example, as mercury, and the space above said liquid including the column 44 is caused to be filled with the vapor of the same and sealed from communication with the atmosphere.

The chamber 42 has placed therein a quantity of a liquid 65 of a relatively low boiling point, such for example as alcohol, resting in immediate thermal contact with the partition 43, whereby heat may readily be transmitted to the same from the chamber 41. The space in the chamber 42 above the surface of the liquid 65 is caused to be filled with a vapor of said liquid and is sealed from communication with the atmosphere.

The principle of operation of the device is as follows: Upon a suitable current being passed from the source 49 through the heating element 48, heat will be developed therein and will be transmitted through the bottom wall of the vessel 40 into the chamber 41, causing the liquid 64 contained therein to be boiled, and its vapor to pass upward through the chamber 41 in contact with the partition 43 and the inner walls of the column 44, whereby said vapor will be condensed. The proportion of liquid and vapor in the chamber 41, and the pressure of operation, are made such that, for a considerable variation in the amount of applied heat all the vapor generated will be condensed by contact with the relatively cool walls of the partition 43 and the column 44, whereby, according to the principle hereinbefore set forth, there will be maintained a constant pressure and temperature within the chamber 41. It will be noted that this is achieved without regard to variation of the continuous or the mean value of electric current in the heater 48, and that, without regulation of said current, there will be maintained within the chamber 41 constant values of pressure and temperature.

The liquid 65 in the chamber 42 and in contact with the partition 43 will receive through said partition from the heated vapors in the chamber 41 sufficient heat to cause said liquid to be boiled; and the vapor therefrom will rise in the chamber 42 and will be condensed by contact with the outer wall of the same which is normally cooled by the atmosphere. So long as the rate of condensation of vapor of the liquid 65 in the chamber 42 is sufficient to keep pace with the supply of heat conducted to said liquid through the partition 43, there will be maintained within the chamber 42 a pressure and a temperature of constant value, differing from the corresponding values existing within the chamber 41.

Since a constant temperature is maintained in each of the chambers 41 and 42 there will of necessity be a constant temperature difference between the respective groups of thermocouples in said chambers; and since these couples are connected in such a manner as to provide between the external terminals 60 and 61 a potential difference representative of said temperature difference, it will follow that so long as the supply of heat to the system does not exceed the dissipating facilities of said system whereby condensation of vapors is effected, the electrical potential between the terminals 60 and 61 will be maintained at a constant value.

Fig. 3 is a diagrammatic representation of a thermoelectric generator of the type shown in Fig. 2 connected in a conventional potentiometer circuit as a source of slide-wire current supply therefor, and also serving the additional function of providing a constant cold-junction reference temperature in a thermoelectric temperature measuring system. The group of thermocouples 50, 51 and 52 are generally represented as in the chamber 41, and the corresponding group 54, 55 and 56 as in the chamber 42, these couples being interconnected and brought to external terminals 60 and 61 in the manner illustrated in Fig. 2. Between the terminals 60 and 61 is connected a potentiometer slide-wire resistance 70, having in series therewith an adjustable resistor 71, whereby current in the slide-wire 70 may be set to a predetermined value, which value will be maintained by the constant voltage existing between the terminals 60 and 61.

A thermocouple 72 exposed to a temperature to be measured is formed of two thermoelectric elements 73 and 74, the former being composed of a metal having a zero thermoelectromotive force against the materials of the potentiometer circuit. For example, the element 73 may be formed of copper and the element 74 of constantan. The element 73 is connected by means of a conductor 75 to one terminal of a galvanometer 76, the other terminal of which is connected by means of a flexible lead 77 to a sliding contact 78 adapted to engage the slide-wire 70 at any point along its length. The element 79 of the junction 62 in the chamber 42 which is connected to the terminal 63 is formed of a material identical with, or having no thermoelectromotive force against, that of the element 74 of the couple 72; and a conductor 80 of similar material is provided, whereby the last-named element is connected to said terminal 63. The remaining element 81 of the couple may be formed of copper. The junction 62 will then become a constant temperature reference point in the thermoelectric measuring circuit. Thus the potential as measured between the terminal 60 and the point of engagement between the slider 78 and the slide-wire 70 when a balance is indicated by the galvanometer 73, will be a true representation of the temperature to which the couple 72 is exposed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:
1. The method of generating an electromotive force of constant value, comprising imparting to opposed junctions of a thermopile the temperatures in enclosed chambers containing liquids of different boiling points, boiling said liquids, and condensing the vapors of said liquids in said chambers as fast as said vapors are produced.

2. In combination, two closed chambers each containing a body of liquid and its vapor, the liquids in said chambers having different boiling points means for applying heat to the liquid in each of said chambers to evaporate the same, means providing for condensation of the vapor formed in each of said chambers as fast as it is produced, and heat-responsive electric potential producing means exposed to the temperatures in said chambers for producing an electromotive force representative of the temperature difference between the interiors of said chambers.

3. In combination, two closed chambers each containing a body of liquid and its vapor, the liquids in said chambers having different boiling points, means for applying heat to the liquid in each of said chambers to evaporate the same, means providing for condensation of the vapor formed in each of said chambers as fast as it is produced, and a thermoelectric battery having its hot junctions in one and its cold junctions in the other of said chambers for producing an electromotive force representative of the temperature difference between the interiors of said chambers.

4. A thermoelectric generator comprising a vessel divided into two closed chambers having between the same a heat-conducting partition, a body of liquid in one of said chambers, means for heating said liquid to evaporate the same, a body of liquid in the other of said chambers having a boiling point lower than that of the first mentioned liquid and in contact with said partition whereby the transfer of heat from the vapor in the first of said chambers to the liquid in the second of said chambers will cause said vapor to be condensed and said last-named liquid to be evaporated, means providing for condensation of the vapor of said last-named liquid as fast as it is formed, and a thermoelectric battery having its hot junctions in the first-named and its cold junctions in the second named of said chambers in order to develop an electromotive force representative of the temperature difference between the interiors of said chambers.

5. In combination, two closed chambers each adapted to contain a body of liquid and its vapor, means for applying heat to the liquid in each of said chambers to evaporate the same, means providing for condensation of the vapor formed in each of said chambers as fast as it is produced, a thermoelectric battery having its hot junctions in one and its cold junctions in the other of said chambers for producing an electromotive force representative of the temperature difference between the interiors of said chambers, an external thermocouple, a thermocouple in one of said chambers and electrically connected to said battery, and an electrical connection from said external thermocouple to the last-mentioned thermocouple whereby said last-mentioned thermocouple provides a constant temperature reference point for said external thermocouple.

6. Apparatus for providing a constant potential and a constant temperature reference point for application to an electrical circuit, said apparatus comprising two closed vessels each containing a fluid to be evaporated and having means for condensing the vapor of said fluid as fast as it is formed, a thermoelectric battery having its respective junctions disposed in said vessels to develop a potential representative of the temperature difference between the interiors of said vessels, connections whereby said potential may be applied to said circuit, an external thermocouple in said circuit, a thermocouple in one of said vessels and electrically connected to said battery, and an electrical connection from said external thermocouple to the last-mentioned thermocouple whereby said last-mentioned thermocouple provides a constant temperature reference point for said external thermocouple.

7. Apparatus for providing a constant potential and a constant temperature reference point for application to an electrical circuit, said apparatus comprising two closed vessels each containing a fluid to be evaporated and having means for condensing the vapor of said fluid as fast as it is formed, a thermoelectric battery having its respective junctions disposed in said vessels to develop a potential representative of the temperature difference between the interiors of said vessels, connections whereby said potential may be applied to said circuit, an external thermoelectric junction, a further thermoelectric junction in one of said vessels and electrically connected to said battery, and an electrical connection from said external thermoelectric junction to said further thermoelectric junction whereby the latter presents a constant temperature reference point for said external thermoelectric junction.

PERRY A. BORDEN.

REFERENCES CITED

The following references are of record in the file of this patent:

UNITED STATES PATENTS

| Number | Name | Date |
|---|---|---|
| 375,243 | Acheson | Dec. 20, 1887 |
| 713,562 | Kitsee | Nov. 18, 1902 |
| 721,770 | Zeleny | Mar. 3, 1903 |
| 1,209,372 | Wunsch | Dec. 19, 1916 |
| 1,245,956 | Northrup | Nov. 6, 1917 |
| 1,344,462 | Thwing | June 22, 1920 |
| 1,375,872 | Varley | Apr. 26, 1921 |
| 1,441,207 | Blakeslee | Jan. 9, 1923 |
| 1,662,889 | Hubbard | Mar. 20, 1928 |
| 1,666,919 | Steurer | Apr. 24, 1928 |
| 2,312,022 | Brooks | Feb. 23, 1943 |

FOREIGN PATENTS

| Number | Country | Date |
|---|---|---|
| 318,570 | France | June 30, 1902 |

OTHER REFERENCES

Brown Catalog, page 12, 1924.
Bristol Catalog, 1450, page 5, 1935.